(12) United States Patent
Weikart et al.

(10) Patent No.: US 7,791,815 B2
(45) Date of Patent: Sep. 7, 2010

(54) DIELECTRIC COATINGS FOR ELECTROWETTING APPLICATIONS

(75) Inventors: Christopher M. Weikart, Midland, MI (US); Steven J. Martin, Midland, MI (US); Mathieu Maillard, Lyons (FR); Julien Legrand, Lyons (FR)

(73) Assignee: Varioptic S.A., Lyons (FR)

( * ) Notice: Subject to any disclaimer, the term of this patent is extended or adjusted under 35 U.S.C. 154(b) by 440 days.

(21) Appl. No.: 11/965,108

(22) Filed: Dec. 27, 2007

(65) Prior Publication Data

US 2008/0225378 A1 Sep. 18, 2008

Related U.S. Application Data

(60) Provisional application No. 60/894,584, filed on Mar. 13, 2007.

(51) Int. Cl.
*G02B 1/06* (2006.01)
*G02B 15/14* (2006.01)

(52) U.S. Cl. ............................. 359/666; 359/676
(58) Field of Classification Search ............... 359/676, 359/665–667
See application file for complete search history.

(56) References Cited

U.S. PATENT DOCUMENTS

2003/0048541 A1* 3/2003 Kroupenkine et al. ....... 359/665
2005/0088754 A9* 4/2005 Kroupenkine ............... 359/665

* cited by examiner

*Primary Examiner*—Scott J Sugarman
(74) *Attorney, Agent, or Firm*—Osha • Liang LLP

(57) ABSTRACT

A dielectric coating is provided which has both a dielectric constant greater than 2.5 and a hydrophobic surface. The dielectric coating may be provided by plasma enhanced chemical vapor deposition (PECVD) of organosilane, organosiloxane, organosilazane, organometallic, and/or hydrocarbon precursors. Methods are also provided for altering the contact angle of a liquid in contact with the dielectric coating, e.g., for electrowetting applications.

45 Claims, 6 Drawing Sheets

"Example 1"

"Example 1"

"Example 7"

"Example 7"

DIELECTRIC COATINGS FOR ELECTROWETTING APPLICATIONS

FIELD OF THE INVENTION

The invention relates to improved dielectric coatings for devices which operate based on the electrowetting effect. In particular, the invention relates to dielectric coatings that function as both hydrophobic and dielectric layers.

BACKGROUND OF THE INVENTION

Electrowetting is a robust phenomenon in which the properties of both the insulating and the hydrophobic layers are critical. Substantial activities have been aimed at optimizing the properties of these layers in order to minimize the voltage required for water contact angle reduction and contact angle hysteresis. At the same time, the materials used should be chemically inert and stable in order to ensure reproducibility and a long lifetime.

Such materials have been approached by using either an intrinsically hydrophobic insulator or by covering hydrophilic insulators with a thin hydrophobic top coating. Frequently, thin layers of amorphous fluoropolymers or hydrocarbon polymers (such as Parylene-C or Parylene-N) have been used. However, the dielectric constant of such hydrocarbon and fluoropolymers are low; for example, the dielectric constant of Teflon AF™ is ~1.9 and the dielectric constant of Parylene-C™ is ~3.1. Popular hydrophilic inorganic insulator materials include $SiO_2$ [see, Jones et al., Langmuir 19:7646 (2003); Yoon and Garrell, Anal. Chem. 75:5097 (2003); Moon et al., J. Appl. Phys. 92:4080 (2002); Huh et al., J. Am. Chem. Soc. 125:14678 (2003); Cho et al., J. Microelectromech. Syst. 12:70 (2003)] and SiN [see Moon, et al., ibid; Acharya et al., Appl. Phys. Lett. 83:4912 (2003); Krupenkin et al., Appl. Phys. Lett. 82:316 (2003)]. In combination with a hydrophobic top coating, inorganic insulators perform well as electrowetting substrates.

Applications of the electrowetting phenomena are varied. A sandwich design consisting of two parallel substrates with the liquid confined in between has become standard. One of the substrates contains an insulated electrode required for liquid actuation; the other substrate consists of a homogeneous electrode that provides electrical contact to the liquid. A variety of applications have been envisioned which take advantage of the electrowetting effect. The focal length of a liquid lens can be tuned by adjusting its shape by changing the contact angle of sessile droplets via electrowetting. This allows for the design of optical systems with variable focal length that can be addressed purely electrically, as first described by Peseux and Berge [see, Berge and Peseux, Eur. Phys. J. E 3:159 (2000)]. Examples of such devices can be found in, for example, EP 1,166,157 and US Patent Application No. 2006/0126190.

Electrowetting-based reflective displays involve laterally confining an oil droplet, containing dissolved dye, to a square pixel. Upon applying a voltage, the oil film ruptures and contracts into one corner of the pixel that can be predefined by a passive chemical wettability pattern. Other applications of this principle include switches, latching relays, optical shutters, and micropumps [see, Lee and Kim, J. Microelectromech. Syst. 9:171 (2000); Yun et al., J. Microelectromech. Syst. 11:454 (2002)].

One critical materials parameter for the insulator is its dielectric strength, or the electrical breakdown field strength $E_{BD}$, which limits the minimum thickness of the insulating layer that can be used without breakdown voltage. Dielectric breakdown occurs at $U_{BD}=E_c d$, where $E_c$ is a constant which is unique for each material, and directly proportional to the energy gap for conduction in the material, and $U_{BD}$ is the applied voltage to the dielectric layer. The voltage required to achieve a desired variation of the contact angle $\Delta\cos\theta$ is given by [see, Seyrat and Hayes, J. Appl. Phys. 90:1383 (2001)] $U(\Delta\cos\theta)=(d\sigma_{lv}\Delta\cos\theta/\epsilon_0\epsilon_d)^{1/2}$, where d is the thickness of the insulator, $\sigma_{lv}$ is the interfacial energy (liquid-vapor) of the liquid on the surface, $\epsilon_0$ is the permittivity of free space $(8.854\times10^{-12}\ C^2/N\ m^2)$, and $\epsilon_d$ is the dielectric constant of the insulating layer.

Another critical materials parameter is the reliability of the wetting property of the hydrophobic layer. Reliability is the ability for the coating to keep its initial physical properties after a set of tests. For a liquid lens device for example, reliability is evaluated with the measurements of the hysteresis, wave front error or stability of the driving voltage. Usually these tests include storage of the device at elevated temperature and ON/OFF tests (the device is alternatively turned ON or OFF for thousands or millions of times).

As can be seen from the preceding relationships, the potential required for a certain $\Delta\cos\theta$ for a liquid can be decreased by one or more of, decreasing the thickness, decreasing the interfacial energy, and/or increasing the dielectric constant of the insulator. Current solutions using hydrocarbon or fluoropolymer insulating layers are limited due to their low dielectric strengths, necessitating thick insulating layers, typically on the order of 1 μm. Such thick layers also require higher operating potentials to achieve the desired surface effects.

Therefore, there exists a need in the art for insulating materials which address each of these material properties. Materials with higher dielectric constants in combination with lower interfacial or surface energies and high dielectric strength (or high electrical breakdown field strength $E_{BD}$) would enable the electrowetting effect with increasingly thinner device architectures. In addition, the use of such thinner layers would also allow the use of lower applied potentials, each of which are highly desirable in electronic devices, and impact such considerations as device size and battery lifetime.

However, there are very few materials combining both suitable dielectric and reliable hydrophobic properties within a broad thickness range, especially when thickness is below one micrometer.

The present invention solves this problem and allows for the use of reliable and lower driving voltages in, for example, variable focal length devices, by carefully designing a stack of at least two layers, one of the layers being a hydrophobic layer arranged on top of the overall coating, in contact with the liquid, wherein the layer presenting the lowest dielectric strength, usually the hydrophobic layer, is chosen with a given thickness such as it has a negligible contribution to the overall capacitance and driving voltage, therefore enabling to choose an hydrophobic layer with the highest reliability, keeping for the overall coating a high dielectric strength.

SUMMARY OF THE INVENTION

More generally, in a first aspect, the invention provides a device comprising a liquid, a first member in contact with the liquid, wherein the first member comprises a coating, wherein the coating comprises at least two layers, a first layer which is a hydrophobic layer having a dielectric constant of greater than about 2.5 and a second layer which is an insulating layer having a dielectric constant of greater than about 2.5, wherein
the ratio of the surface capacitance of the hydrophobic layer and the surface capacitance of the overall coating is greater than about 2.0;
and
a second member in contact with the liquid; such device is referred to hereafter as Device A.

The surface capacitance $Cs_h$ of the hydrophobic layer is defined by $Cs_h = \epsilon_0 \epsilon_h / d_h$, where $d_h$ and $\epsilon_h$ are the thickness and the dielectric constant of the hydrophobic layer, and the overall capacitance is defined by $$C_S = \frac{1}{\sum_i d_i / \epsilon_i \epsilon_0}$$

where $d_i$ and $\epsilon_i$ are the thicknesses and the dielectric constants of each layer of the stack.

In a second aspect, the invention provides a method for affecting the contact angle of a liquid comprising applying a voltage across the first and second members of any of the devices of the first aspect.

DETAILED DESCRIPTION OF THE INVENTION

Figure 1:
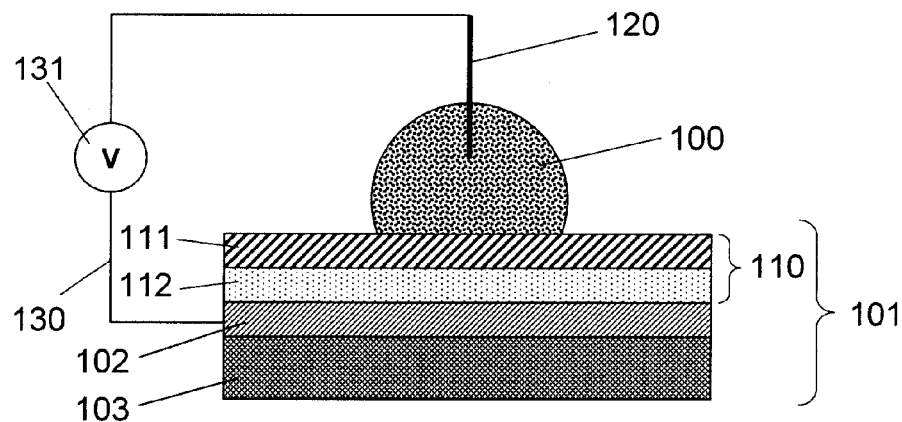
FIG. 1 illustrates a device according to the first aspect of the invention wherein the liquid is a single phase.

In an embodiment of Device A, the coating is in contact with the liquid, such is referred to hereafter as Device B.

In another embodiment of Device A, the first and second members comprise a circuit.

In another embodiment of Device A, the coating is in contact with the liquid, and the first and second members comprise a circuit.

In another embodiment of device A, the coating comprises at least three layers, the dielectric constant of each layer being greater than about 2.5, such is referred to hereafter as Device C.

In an embodiment of Devices A-C, the liquid has two immiscible phases; such is referred to hereafter as Device D.

In an embodiment of Device A-D, the first member further comprises one or more conducting or semiconducting materials, such is referred to hereafter as Device E. Preferably, the conducting or semiconducting material of the first member is in contact with the coating. More preferably, the conducting or semiconducting material is in contact with the coating and is not in contact with the liquid.

In an embodiment of Device A-D, the second member further comprises one or more conducting or semiconducting materials, such is referred to hereafter as Device F. In one embodiment of Device F, the conducting or semiconducting material of the second member is in contact with the liquid. In another embodiment of Device F, the conducting or semiconducting material of the second member is not in contact with the liquid.

In an embodiment of Device A-D, the first and second members each further comprise, independently, one or more conducting or semiconducting materials, such is referred to hereafter as Device G.

In a preferred embodiment of Device A-G, the ratio of the surface capacitance of the hydrophobic layer and the surface capacitance of the overall coating is greater than about 5.0. Even more preferably the ratio is greater than about 10.0. Even more preferably, the ratio is greater than about 15.0.

In a preferred embodiment of Device A, the second layer has a dielectric constant greater than about 3. More preferably, the dielectric constant is greater than about 5.0. Even more preferably, the dielectric constant is greater than about 10.0. Even more preferably, the second layer comprises $SiO_2$, silicon oxynitride, $Si_3N_4$, hafnium oxide, yttrium oxide, lanthanum oxide, titanium dioxide, aluminum oxide, tantalum oxide, hafnium silicate, zirconium oxide, zirconium silicate, barium titanate, lead zirconate titanate, strontium titanate, barium strontium titanate, or mixtures thereof.

In a preferred embodiment of Device A, the second layer comprises Parylene C or parylene N.

In other preferred embodiments of Device A, the second layer has a dielectric constant of about 3.5 to 1000. More preferably, the dielectric constant is about 3.5 to 250. Even more preferably, the dielectric constant is about 3.5 to 200.

In other preferred embodiments of Device A, the second layer has a dielectric constant of about 5.0 to 1000. More preferably, the dielectric constant is about 5.0 to 250. Even more preferably, the dielectric constant is about 5.0 to 200.

In other preferred embodiments of Device A, the second layer has a dielectric constant of about 10.0 to 1000. More preferably, the dielectric constant is about 10.0 to 250. Even more preferably, the dielectric constant is about 10.0 to 200.

In a preferred embodiment of Device F and G, the second member further comprises a second hydrophobic layer in contact with the liquid, such are referred to hereafter as Device H.

In a preferred embodiment of Device A-H, the first and second members comprise a circuit, such is referred to hereafter as Device I.

In a preferred embodiment of Device A-H, the coating is in contact with the liquid, and the first and second members comprise a circuit.

In a preferred embodiment of Device A-I, the first member further comprises a first support which is glass, plastic, or silicon; such is referred to hereafter as Device J.

In a preferred embodiment of Device A-I, the second member further comprises a second support which is glass, plastic, or silicon; such is referred to hereafter as Device K.

In a preferred embodiment of Device A-I, the first member further comprises a first support and the second member further comprises a second support wherein the first and second supports are independently glass, plastic, or silicon, such is referred to hereafter as Device L.

In another preferred embodiment of the first aspect, the invention provides a device comprising,
 a liquid;
 a first member, wherein
  the first member comprises a coating and one or more conducting or semiconducting materials in contact with the coating, wherein
   the coating is in contact with the liquid and comprises at least two layers, a first layer which is a hydrophobic layer having a dielectric constant of greater than about 2.5 and a second layer which is an insulating layer having a dielectric constant of greater than about 2.5, wherein
    the ratio of the surface capacitance of the hydrophobic layer and the surface capacitance of the overall coating is greater than about 2.0,
 and
 a second member in contact with the liquid; such is referred to hereafter as Device M.

In another preferred embodiment of the first aspect, the invention provides a device comprising,
 a liquid;
 a first member, wherein
  the first member comprises a coating and one or more conducting or semiconducting materials in contact with the coating, wherein
   the coating is in contact with the liquid and comprises at least two layers, a first layer which is a hydrophobic layer having a dielectric constant of greater than about 2.5 and a second layer which is an insulating layer having a dielectric constant of greater than about 2.5, wherein
    the ratio of the surface capacitance of the hydrophobic layer and the surface capacitance of the overall coating is greater than about 2.0,
 and
 a second member comprising one or more conducting or semiconducting materials in contact with the liquid;
such is referred to hereafter as Device N.

In another preferred embodiment of the first aspect, the invention provides a device comprising,
 a liquid;
 a first member, wherein
  the first member comprises a coating and one or more conducting or semiconducting materials in contact with the coating, wherein
   the coating comprises at least two layers, a first layer which is a hydrophobic layer having a dielectric constant of greater than about 2.5 and a second layer which is an insulating layer having a dielectric constant of greater than about 2.5, wherein
    the ratio of the surface capacitance of the hydrophobic layer and the surface capacitance of the overall coating is greater than about 2.0, and
   the hydrophobic layer is in contact with the liquid,
 and
 a second member comprising one or more conducting or semiconducting materials and in contact with the liquid; such is referred to hereafter as Device O.

In another preferred embodiment of the first aspect, the invention provides a device comprising,
 a liquid;
 a first member, wherein
  the first member comprises a coating and one or more conducting or semiconducting materials in contact with the coating, wherein
   the coating comprises at least two layers, a first layer which is a hydrophobic layer having a dielectric constant of greater than about 2.5 and a second layer which is an insulating layer having a dielectric constant of greater than about 2.5, wherein
    the ratio of the surface capacitance of the hydrophobic layer and the surface capacitance of the overall coating is greater than about 2.0 and
   the hydrophobic layer is in contact with the liquid,
 and
 a second member in contact with the liquid; such is referred to hereafter as Device P.

In a preferred embodiment of Device A-P, the hydrophobic layer has a dielectric constant of greater than 3.0 and more preferably greater than about 3.2. More preferably, the hydrophobic layer has a dielectric constant of greater than about 3.5. Even more preferably, the hydrophobic layer has a dielectric constant of greater than about 3.7. Even more preferably, the hydrophobic layer has a dielectric constant of greater than about 3.9.

In other embodiments of Device A-P, the hydrophobic layer has a dielectric constant of about 3.0-10.0. More preferably, the hydrophobic layer has a dielectric constant of about 3.0-5.0. Even more preferably, the hydrophobic layer has a dielectric constant of about 3.5-5.0.

In a preferred embodiment of Device L-P, the second member is in contact with the liquid.

In a preferred embodiment of Device L-P, the first member further comprises a first support. In a preferred embodiment, the first support is glass, plastic, or silicon.

In a preferred embodiment of Device L-P, the second member further comprises a second support. In a preferred embodiment, the second support is glass, plastic, or silicon.

In a preferred embodiment of Device L-P, the first member further comprises a first support and the second substrate further comprises a second support. In a preferred embodiment, the first and second supports are independently glass, plastic, or silicon.

In a preferred embodiment of Device A-P, the first and second members comprise a circuit.

In a preferred embodiment of Device A-P, the first and second members comprise a circuit, and the circuit comprises a voltage generating source.

In a preferred embodiment of Device A-P, only one layer of the coating is in contact with the liquid. In a more preferred embodiment of Device A-P, only the hydrophobic layer of the coating is in contact with the liquid.

In a preferred embodiment of Device A-P, the first and second members independently comprises a metal, conducting polymer, or conducting oxide. Preferably, the metal is aluminum, platinum, copper, silver, nickel, gold, or mixtures thereof. Preferably, the conducting polymer is a polythiophene, poly(3-hexylthiophene), poly(3,4,-ethylenedioxythiophene), polyaniline, poly(acetylene), poly(fluorene), poly(phenylene ethynylene), poly(phenylene vinylene), poly(phenylene sulfide), poly(p-phenylene), polypyrrole, PEDOT PSS (Poly(3,4-ethylenedioxythiophene)-Polystyrene Sulfonate, derivatives thereof, or mixtures thereof.

Preferably, the conducting oxide is indium-tin-oxide, fluorinated tin oxide, or aluminum doped-zinc oxide.

The metal, conducting polymer, or conducting oxide substrate preferably has a surface roughness of less than about 200 nm; more preferably less than about 100 nm; even more preferably less than about 50 nm.

In a preferred embodiment of Device A-P, the coating has a thickness of about 10 nm to about 1000 nm. Preferably, the coating has a thickness of about 10 nm to about 500 nm. More preferably, the coating has a thickness of about 10 nm to about 250 nm.

In a preferred embodiment of Device A-P, the hydrophobic layer of the coating has a polar surface energy component of less than about 2.0 mN/m. Preferably, the polar surface energy component of less than about 1.0 mN/m. More preferably, the polar surface energy component of about 0.0 mN/m.

In other preferred embodiment of Device A-P, the hydrophobic layer has an oil droplet (surrounded by aqueous phase) contact angle of less than about 20 degrees, more preferably less than about 15 degrees, and even more preferably less than about 10 degrees.

In a preferred embodiment of Device A-P, the hydrophobic layer of the coating has a thickness of about 10 nm to about 250 nm; more preferably, about 50 nm to 150 nm.

In a more preferred embodiment of Device A-P, the coating has a thickness of about 100 nm to about 1000 nm and the hydrophobic layer has a thickness of about 10 nm to 250 nm.

In another more preferred embodiment of Device A-P, the coating has a thickness of about 100 nm to about 1000 nm and the hydrophobic layer has a thickness of about 50 nm to 150 nm.

In another more preferred embodiment of Device A-P, the coating has a thickness of about 100 nm to about 500 nm and the hydrophobic layer has a thickness of about 10 nm to 250 nm.

In another more preferred embodiment of Device A-P, the coating has a thickness of about 100 nm to about 500 nm and the hydrophobic layer has a thickness of about 50 nm to 150 nm.

In a preferred embodiment of Device A-P, each layer of the coating is formed by plasma enhanced chemical vapor deposition (PECVD) from a vapor comprising an organosilane, organosiloxane, organosilazane, organometallic, or hydrocarbon compound.

PECVD is a process to deposit thin films from a gas state (vapor) to a solid state on a substrate. The reactive chemical species involved in the process are generated by the creation of a plasma from the reacting gases. The plasma is generally created by RF (AC) frequency or DC discharge between two electrodes.

PECVD process parameters include flow rate, F, in standard cubic centimeters per minute (sccm), applied power, W, in Watts (W), resonant frequency in kilohertz (kHz), pressure in milliTorr (mTorr), substrate temperature in Celsius degrees (° C.) and geometrical factors such as size of chamber, electrode size, electrode orientation and distance from substrate, etc. The composite parameter, W/FM, or energy per unit mass of monomer was also used in this study.

This composite parameter, expressed in MJ/kg, is calculated from the following expression $$W/FM(MJ/kg) = \frac{W(Watt)}{F(sccm) \times M(g/mol)} \times 1340$$

whereby M is the molecular weight of the precursor in g/mol.

In a preferred embodiment of Device A-P, the hydrophobic layer of the coating is formed by PECVD under conditions controlled by the composite plasma parameter W/FM, wherein W/FM <about 200 MJ/kg; more preferably <100 MJ/kg, and even more preferably <30 MJ/kg.

Preferably, for preparing the layers of the coating, the organosilane, organosiloxane, or organosilazane is of one of the formulas, $(R_3)Si$—$[(R_2)Si]_n$—$R$,  $(R_3)Si$—$[X]$—$Si(R)_3$, or

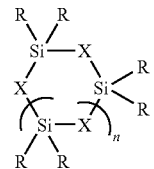

wherein
each X is independently —O—, —N(R$^1$)—, or —(R$^2$)$_2$C—;
each R is independently H, C$_1$-C$_6$ alkyl, C$_1$-C$_6$ alkoxy, C$_2$-C$_6$ alkenyl, or phenyl;
each R$^1$ and R$^2$ is independently H or C$_1$-C$_6$ alkyl;
and each n is independently 0, 1, 2, or 3.

More preferably, the organosilane compound is silane, dimethylsilane, trimethylsilane, tetramethylsilane, propylsilane, phenylsilane, hexamethyldisilane, 1,1,2,2-tetramethyldisilane, bis(trimethylsilyl)methane, bis(dimethylsilyl)methane, vinyltrimethylsilane, or mixtures thereof.

More preferably, the organosiloxane compound is tetramethylsiloxane, hexamethylsiloxane, divinyltetramethyldisiloxane, divinylhexamethyltrisiloxane, trivinylpentamethyltrisiloxane, tetraethylorthosilicate, vinyl trimethoxysilane, vinyltriethoxysilane, ethylmethoxysilane, ethyltrimethoxysilane, methyltrimethoxysilane, vinyltrimethyoxysilane, octamethylcyclotetrasiloxane, tetramethylcyclotetrasiloxane, tetraethylorthosiloxane, or mixtures thereof.

More preferably, the organosilazane compound is hexamethyldisilazane, tetramethyldisilazane, hexamethylcyclotrisilazane, or mixtures thereof.

More preferably, the organometallic compound is tetramethyltin, diethylzinc, titanium tetrachloride, butyltrivinyltin, or mixtures thereof.

More preferably, the hydrocarbon compound is methane, acetylene, ethane, ethylene, styrene, or mixtures thereof.

In a more preferred embodiment of Device A-P, the hydrophobic layer is in contact with the liquid, formed by PECVD according to any of the preceding embodiments, and thermally annealed in an inert partial vacuum atmosphere. Preferably, the inert atmosphere comprises nitrogen, helium, and/or argon. The preferred temperature for annealing is about 200-600° C. More preferably, the temperature is about 300-500° C. Even more preferably, the temperature is about 350-450° C. The preferred vacuum pressure for annealing is about $5\times10^{-3}$ to $5\times10^{-6}$ Torr. More preferably, the pressure is about $5\times10^{-4}$ to $5\times10^{-5}$ Torr. The preferred time for annealing the samples is from about 5-60 minutes. More preferably, the time is about 15-45 minutes. Even more preferably, the time is about 25-35 minutes.

The Owens Wendt Theory, also known as the harmonic mean method, was used to measure the surface energy of the hydrophobic coatings. Owens Wendt Theory resolves the surface energy into polar and dispersive components. The dispersive component accounts for surface interactions from Van der Waals and other non-site specific interactions between a solid and liquid. The polar component accounts for dipole-dipole, dipole-induced, hydrogen bonding and other site specific interactions between a solid and liquid. The two parameters of the Owens-Wendt model correspond to the polar and dispersive interactions. The model is based on two fundamental equations which describes the surface interactions between solids and liquids. Good's Equation is expressed as $$\sigma_{SL}=\sigma_S+\sigma_L-2(\sigma_L^D\sigma_S^D)^{1/2}-2(\sigma_L^P\sigma_S^P)^{1/2}$$

Young's Equation is expressed as $$\sigma_S=\sigma_{SL}+\sigma_L\cos\theta$$

whereby $\sigma_L$ is the overall surface tension of the wetting liquid, $\sigma_L^D$ is the dispersive component of the surface tension of the wetting liquid, $\sigma_L^P$ is the polar component of the surface tension of the wetting liquid, $\sigma_S$ is the overall surface energy of the solid, $\sigma_S^D$ is the dispersive component of the surface energy of the solid, $\sigma_S^P$ is the polar component of the surface energy of the solid, $\sigma_S^L$ is the interfacial tension between the solid and the liquid, and $\theta$ is the contact angle between the liquid and solid.

Combining Good's and Young's equation produces the following equation:

$$\frac{\sigma_L(\cos\theta+1)}{2(\sigma_L^D)^{1/2}}=(\sigma_S^P)^{1/2}\frac{(\sigma_L^P)^{1/2}}{(\sigma_L^D)^{1/2}}+(\sigma_S^D)^{1/2}$$

which has the linear form of y=mx+b, whereby $$y=\frac{\sigma_L(\cos\theta+1)}{2(\sigma_L^D)^{1/2}};$$

$$m=(\sigma_S^P)^{1/2};$$

$$x=\frac{(\sigma_L^P)^{1/2}}{(\sigma_L^D)^{1/2}};$$

$$b=(\sigma_S^D)^{1/2}$$

The polar and dispersive components of the wetting liquids are known in the literature. A series of 5 replicate contact angles are measured for each of five wetting liquids that include, but are not limited to, diiodomethane, benzyl alcohol, ethylene glycol, formamide and water.

The y's are plotted as a function of x's and the polar component of the surface energy, $\sigma_S^P$, is equivalent to the square root of the slope, m, and the dispersive component of the surface energy, $\sigma_S^D$, is equivalent to the square root of the y-intercept, b.

In other preferred embodiments of Device A-P, when the hydrophobic layer of the coating is formed by PECVD from organosiloxane and/or organosilane compounds, then layer exhibits a dispersive surface energy component less than about 40 mN/m, more preferably less than about 30 mN/m, and most preferably less than about 20 mN/m.

In a more preferred embodiment of Device A-P, only the hydrophobic layer is in contact with the liquid.

Preferably, at least one layer is formed by PECVD from a vapor comprising an oxidizing gas and any of the preceding organosilane, organosiloxane, or organosilazane compounds. For example, when the coating comprises two layers, the first layer is the hydrophobic layer having a dielectric constant greater than 3.0 and the second layer is formed by PECVD from a vapor comprising an oxidizing gas and any of the preceding organosilane, organosiloxane, or organosilazane compounds. Preferred oxidizing gases include, but are not limited to, $O_2$, $N_2O$, $H_2O$, $CO_2$, CO, or mixtures thereof.

In a preferred embodiment of all the preceding embodiments of the first aspect, the liquid comprises water.

In another preferred embodiment of all the preceding embodiments of the first aspect, the liquid comprises two immiscible phases, e.g., water and an oil.

In a more preferred embodiment of all the preceding embodiments of the first aspect, the liquid comprises two immiscible phases, e.g., water and an oil, wherein the water contains an electrolyte, and the oil contains a dichroic dye.

In a second aspect, the invention provides a method for affecting the contact angle of a liquid comprising applying a voltage across the first and second members of a device according to any embodiment of the first aspect of the invention.

In a preferred embodiment of the second aspect, the applied voltage is less than about 40 V. More preferably, the applied voltage is less than about 20 V. Even more preferably, the applied voltage is less than about 10 V.

In another preferred embodiment of the second aspect, the device is part of a variable focal length lens, microelectromechanical system, microfluidic system, or light valve.

In a third aspect, the invention provides a method for changing the focal length of a lens, wherein the lens comprises a liquid, comprising altering the contact angle of a liquid in contact with first and second members according to any embodiment of the first aspect of the invention.

In preferred embodiment of the third aspect, the contact angle of the liquid is altered by applying a voltage across the first and second members.

In a preferred embodiment of the third aspect, the applied voltage is less than about 40 V. More preferably, the applied voltage is less than about 20 V. Even more preferably, the applied voltage is less than about 10 V.

In a fourth aspect, the invention provides a method for moving a liquid, comprising altering the contact angle of a liquid in contact with first and second members according to any embodiment of the first aspect of the invention.

In preferred embodiment of the fourth aspect, the contact angle of the liquid is altered by applying a voltage across the first and second members.

In a preferred embodiment of the fourth aspect, the applied voltage is less than about 40 V. More preferably, the applied voltage is less than about 20 V. Even more preferably, the applied voltage is less than about 10 V.

In a fifth aspect, the invention provides a variable focal length lens assembly comprising a device according to the first aspect of the invention.

Examples of variable focal length lenses in which the systems and methods of the invention can be used include, but are not limited to, those described in European Patent Application No. 1,271,218; WO 2006/027522; US Patent Application No. 2006/0126190; U.S. Pat. No. 6,545,815; U.S. Pat. No. 6,545,816; and U.S. Pat. No. 6,538,823.

In a sixth aspect, the invention provides a microfluidic assembly comprising a device according to the first aspect of the invention.

Examples of microelectromechanical and/or microfluidic systems in which the systems and methods of the invention can be used include, but are not limited to, those described in Moon et al., *J. Appl. Phys.*, 92:4080 (2002); WO 02/07503 (Electrowetting-driven micropumps); US Patent Application No. 2006/0194331 (Apparatus and Methods for manipulating droplets on a printed circuit board); U.S. Pat. No. 6,911,132 (Apparatus for manipulating droplets by electrowetting-based techniques); U.S. Pat. No. 6,989,234 (Electrostatic actuation of droplets); U.S. Pat. No. 6,949,176 (Microfluidic control using dielectric pumping); U.S. Pat. No. 6,829,415 (Optical waveguide devices with electro-wetting actuation); U.S. Pat. No. 7,163,612 (Method, apparatus and article for microfluidic control via electrowetting, for chemical, biochemical and biological assays and the like); and U.S. Pat. No. 7,094,379 (Device for parallel and synchronous injection for sequential injection of different reagents).

In a seventh aspect, the invention provides a light valve assembly comprising a device according to the first aspect of the invention.

Examples of light valves in which the systems and methods of the invention can be used include, but are not limited to, those described in Heikenfeld and Steckl, *Appl. Phys. Lett.* 86:11105 (2005); Hayes and Feenstra, *Nature* 425: 383 (2003) (Video-speed electronic paper based on http://patft.uspto.gov/netacgi/nph-Parser?Sect1=PTO2&Sect2=HITOFF&u=%2Fnetahtml%2FPTO%2Fsearch-adv.htm&r=1&f=G&l=50&d=PTXT&p=1&p=1&S1=%28-%22light+valve%22+AND+electrowetting%29&OS=%22light+valve%22+and+electrowetting&RS=%28%22light+valve%22+AND+electrowetting%29-h0http://patft.uspto.gov/netacgi/nph-Parser?Sect1=PTO2&Sect2=HITOFF&u=%2Fnetalhtml%-2FPTO%2Fsearch-adv.htm&r=1&f=G&l=50&d=PTXT&p=1&p=1&S1=%28-%22light+valve%22+AND+electrowetting%29&OS=%22light+valve%22+and+electrowetting&RS=%28%22light+valve%22+AND+electrowetting%29-h2electrowetting); and U.S. Pat. No. 7,002,666 (Lithographic apparatus and device manufacturing method).

In any of the aspects and embodiments of the invention, the first and second substrates can, independently of one another, possess any of a number of shapes, for example, but not limited to, planar, spherical, or cylindrical.

To illustrate embodiments of the invention, FIG. 1 illustrates a device comprising,
 a liquid (100),
 a first member (101) comprising
 a coating (110), wherein the coating comprises
  a first layer which is a hydrophobic layer with a dielectric constant greater than about 2.5 in contact with the liquid (111), and
  a second layer with dielectric constant greater than about 2.5 (112),
  wherein the ratio of the surface capacitance of the hydrophobic layer and the surface capacitance of the overall coating is greater than about 2.0,
 a conducting or semiconducting materials in contact with the coating (102), and
 a first support (103); and
 a second member in contact with the liquid (120); where the first and second members comprise a circuit (130) which includes a voltage generating source (131).

Figure 2:
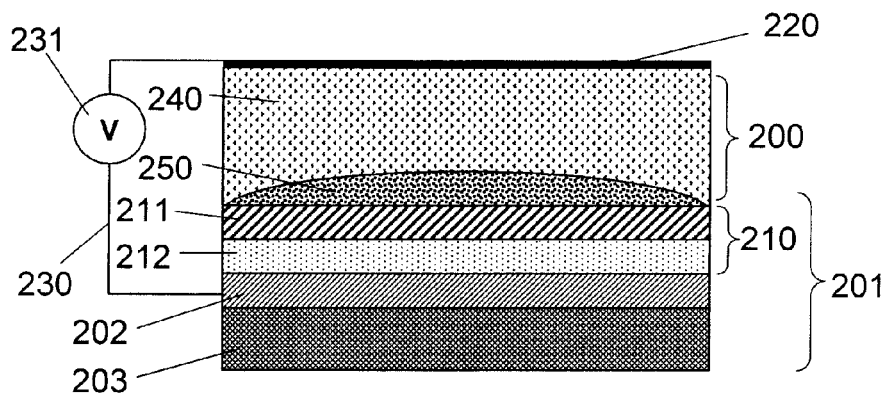
FIG. 2 illustrates a device according the first aspect of the invention wherein the liquid comprises two immiscible phases.

In a second illustrative example, FIG. 2 illustrates a device comprising,
 a liquid (200) having two immiscible phases (240) and (250),
 a first member (201) comprising
 a coating (210), wherein the coating comprises
  a first layer which is a hydrophobic layer with a dielectric constant greater than about 2.5 in contact with the liquid (211), and
  a second layer with dielectric constant greater than about 2.5 (212),
  wherein the ratio of the surface capacitance of the hydrophobic layer and the surface capacitance of the overall coating is greater than about 2.0,
 a conducting or semiconducting materials in contact with the coating (202), and a first support (203); and
 a second member in contact with the liquid (220); where the first and second members comprise a circuit (230) which includes a voltage generating source (231).

Figure 3:
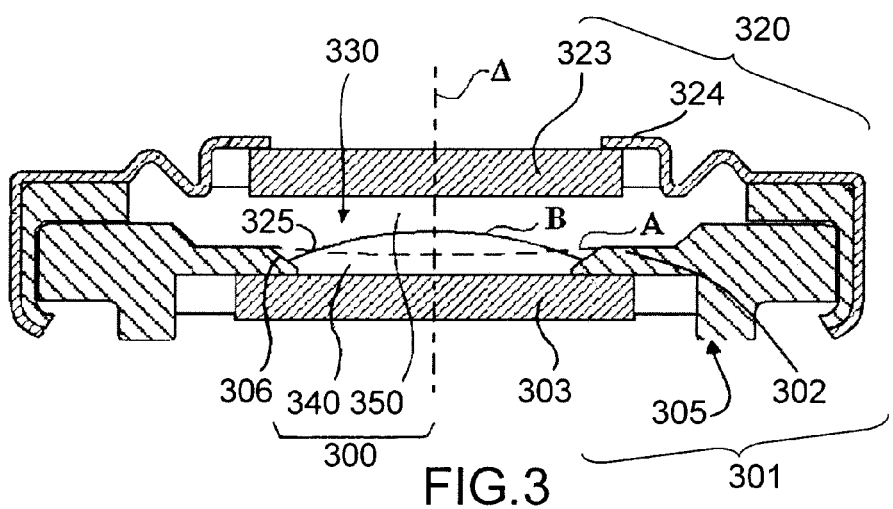
FIG. 3 illustrates an example of a variable focal length lens in which a device according to the first aspect of the invention can be used.
Figure 4:
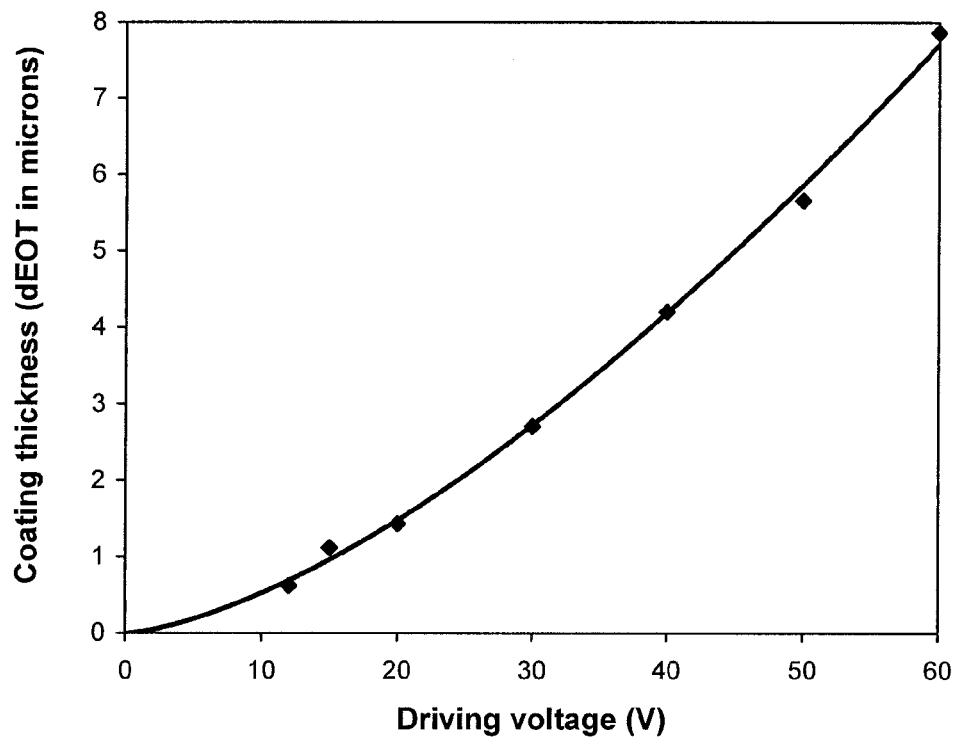
FIG. 4 illustrates the relation between the thickness of the overall coating in microns and the required driving voltage, in a variable focal length lens of the type of the one according to FIG. 3.

FIG. 3 illustrates an example of a variable focal length lens in which a device according to the first aspect of the invention can be used, the overall structure of said variable focal length being similar to FIG. 4 of European Patent Application EP 1662276. It comprises:
 a liquid (300) having two immiscible phases (340) and (350),
 a first member (301) comprising
 a coating (not shown on FIG. 3), wherein the coating comprises
  a first layer which is a hydrophobic layer with a dielectric constant greater than about 2.5 in contact with the liquid, and
  a second layer with dielectric constant greater than about 2.5, wherein the ratio of the surface capacitance of the hydrophobic layer and the surface capacitance of the overall coating is greater than about 2.0,
 a conducting or semiconducting materials (302) in contact with the coating, and
 a first support; and
 a second member in contact with the liquid (320); where the first and second members comprise a circuit (not shown) which includes a voltage generating source.

In the illustrative example of FIG. 3, the first support comprises a window 303 and the second member comprises a transparent window 323, the windows being arranged in parallel and facing each other, and delimiting, in part, an internal volume 330 containing the two immiscible phases 340, 350 of the liquid, with different optical indices. Where the two liquids meet they form an optical interface 325 in the form of a meniscus, which can have a number of different shapes, examples being shown by lines A and B. The liquid phases have substantially equal densities, and one is preferably an insulating liquid, for example comprising oil and/or an oily substance, and the other is preferably a conductive liquid comprising for example an aqueous solution.

Windows 303, 323 are preferably transparent plates formed of an optical transparent material such as glass.

The second member further comprises a cap 324 to which transparent window 323 is fixed and the first member comprises a body 305 to which transparent window 303 is fixed.

The body 305 in this example is made of or covered with the conducting or semiconducting materials 302 and the cap 324 is made of or is covered with a conducting or semiconducting materials, the body 305 and the cap 324 forming two electrodes of the lens. Cap 324 is used to provide a voltage to the conductive liquid phase. Body 305 is used to provide a voltage close to the edge of the liquid-liquid interface 325. The edge of the liquid-liquid interface 325 contacts a conical surface 306 of the annular body. The parts of body 305 in contact with the liquid phases 340, 350, including conical surface 306, are coated with the coating as described above (not shown). The interface 325 traversed an opening in the annual body 305 through which light rays can pass.

Due to the electrowetting effect, it is possible, by applying a voltage between the cap 324 and the body 305, to change the positioning of the edge of the liquid-liquid interface on the conical surface 306, and thereby change the curvature of the refractive interface between liquid phases 340 and 350. For example, the interface may be changed from initial concave shape shown by dashed line A, to a convex shape as shown by solid line B. In this way, rays of light passing through the lens perpendicular to windows 303, 323 in the region of the refractive interface A, B will be focused more or less depending on the voltage applied between the cap 324 and body 305.

The principle of the invention is now explained in more details with reference to the above FIGS. 1 to 3.

In FIG. 1 configuration, contact angle and voltage are related by the Young Lipmann electrowetting equation:

$$\cos\theta = \cos\theta_0 + \frac{C_S}{2\gamma_W}V^2 = f(V^2) \quad [1]$$

with Cs the surface capacity of the insulating layers, and γw the liquid surface tension.

In FIG. 2 configuration, contact angle and voltage are similarly related:

$$\cos\theta = \cos\theta_0 - \frac{C_S}{2\gamma_{OW}}V^2 = f(V^2) \quad [2]$$

where γow is the interface tension between both liquids.

In both cases, surface capacity depends on all the layers comprised between the conducting or semiconducting plate and the conducting liquid, i.e. layers 111 and 112 in FIG. 1 and layers 211 and 212 in FIG. 2. The overall surface capacity is the given by:

$$C_S = \frac{1}{\frac{1}{C_S^1} + \frac{1}{C_S^2}} = \frac{1}{\frac{d_1}{\varepsilon_1\varepsilon_0} + \frac{d_2}{\varepsilon_2\varepsilon_0}} \quad [3]$$

with ∈ the dielectric constant of a given layer and $d_i$ its thickness.

If the device comprises n layers, surface capacity is then given by:

$$C_S = \frac{1}{\sum_i d_i/\varepsilon_i\varepsilon_0} \quad [4]$$

For description commodity, we'll described in the following the layer thickness in EOT units, i.e. Equivalent Oxide Thickness. EOT corresponds to a SiO2 layer thickness having the same capacitance than the said material. Real thickness is then given by:

$$d_{material} = \frac{\varepsilon_{material}}{\varepsilon_{SiO2}} d_{EOT}. \quad [5]$$

Further, we define the driving voltage as the maximum voltage necessary to obtain a given contact angle range. The exact value for the contact angle range strongly depends on the device and application but a general definition of the driving voltage can be expressed from the previous equation as:

$$V_0 = \sqrt{\frac{2d\gamma_{OW}}{\varepsilon\varepsilon_0}} = \sqrt{\frac{2\gamma_{OW}}{C_S}} = \sqrt{\frac{2\gamma_{OW}}{\sum \varepsilon_i\varepsilon_0/d_i}} \quad [6]$$

where it has been assumed that: $\cos\theta = \cos\theta_0 - 1$

In a liquid lens of the type described on FIG. 3, the full optical range is typically obtained for contact angles below 90°, typically θm=75°. Therefore, driving voltage is given by:

$$V_{driving} = (1 - \cos 75)V_0 \approx \frac{3}{4}V_0 = \frac{3}{4}\sqrt{\frac{2d\gamma_{OW}}{\varepsilon\varepsilon_0}} = \frac{3}{4}\sqrt{\frac{2\gamma_{OW}}{C_S}} \quad [7]$$

FIG. 4 shows the thickness requirement for a given driving voltage.

As described by these equations, every layer participates to the overall driving voltage through the capacitance. Therefore all the layers are ideally required to be reliable dielectric layers.

If one layer happens to have poor dielectric properties, i.e. having a low breakdown voltage and/or a high dissipation factor, the overall capacitance will consequently fluctuate, both in time and space, generating electric field instabilities and an overall degradation of the device performances and reliability.

We show that the effect related to a singular coating can be described by the ratio between the driving voltage of a stack of coating and the driving voltage of the same stack without taking into account the said coating:

$$\frac{V_0}{V_0^{n-1}} = \quad [8]$$

-continued $$\frac{\sqrt{\frac{2\gamma_{ow}}{C_S}}}{\sqrt{\frac{2\gamma_{ow}}{C_S^{n-1}}}} = \sqrt{\frac{C_S^{n-1}}{C_S}} = \frac{1}{\sqrt{1-\frac{1}{R^c}}} = \frac{1}{\sqrt{1-\frac{d_{EOT}^1}{\sum d_{EOT}^i}}}$$

where $d_{EOT}$ is the thickness of a given coating in equivalent oxide thickness unit and Rc is defined as the ratio between the upper coating surface capacitance and the overall surface capacitance. For a stack of two coatings said ratio is given by:

$$R_2^c = \frac{C_S^1}{C_S^{total}} = C_S^1\left(\frac{1}{C_S^1}+\frac{1}{C_S^2}\right) = 1+\frac{C_S^1}{C_S^2} = 1+d_{EOT}^2/d_{EOT}^1 \qquad [9]$$

In the case of a multiple stack of n coatings (n≧2), the same ratio is given by:

$$R_n^c = \frac{C_S^1}{C_S} = C_S^1\left(\sum_{i=1}^n \frac{1}{C_S^i}\right) = 1+C_S^1\sum_{i=2}^n\frac{1}{C_S^i} = \frac{1}{d_{EOT}^1}\sum_{i=1}^n d_{EOT}^i \qquad [10]$$

Therefore, the voltage ratio is representative of the maximum driving voltage fluctuation that could be expected if the upper coating has some dielectric properties failure.

Figure 5:
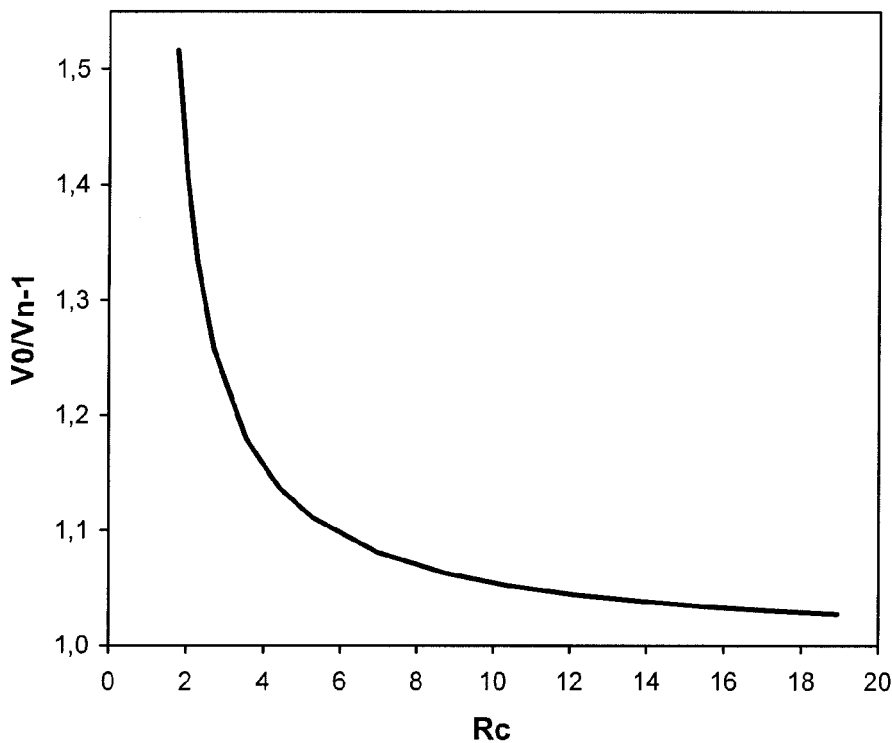
FIG. 5 illustrates the relation between the voltage fluctuations and the surface capacitance ratio between the hydrophobic layer and the overall coating, in a variable focal length lens of the type of the one according to FIG. 3.

FIG. 5 illustrates the maximum driving voltage fluctuation as function of the value of the Rc Ratio. The applicant has shown both theoretically and experimentally, as it will be described using the examples below, that above a ratio of 2, the driving voltage fluctuation is lower than about 1.5 (50% fluctuation). Above a ratio of 5, the driving voltage fluctuation is lower than about 1.1 (10% fluctuation).

Definitions

The term "alkenyl" as used herein, means a straight or branched chain hydrocarbon containing from 2 to 6 carbons and containing at least one carbon-carbon double bond formed by the removal of two hydrogens. Representative examples of alkenyl include, but are not limited to, ethenyl, 2-propenyl, 2-methyl-2-propenyl, 3-butenyl, 4-pentenyl, and 5-hexenyl.

The term "alkoxy" as used herein, means an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

The term "alkyl" as used herein, means a straight or branched chain hydrocarbon containing from 1 to 6 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, and n-hexyl.

The phrase "in contact" as used herein, means a union or junction is present between two surfaces, i.e., the touching or mutual tangency of the two surfaces.

The term "circuit" as used herein, means a complete path of an electric current which may include the source of electric energy.

The term "conducting" as used herein, means to have the quality of transmitting electricity.

The term "dielectric constant" as used herein, is the ratio of the electric field strength in vacuum to that in a given medium (as known as relative permittivity) as a function of the frequency of the applied electromagnetic field.

The term "hydrophobic layer" as used herein, means that the material has at least one of, a water contact angle of greater than 90 degrees, an oil droplet (surrounded by aqueous phase) contact angle of less than about 20 degrees, a dispersive surface energy component less than about 40 mN/m, and/or polar surface energy component of less than about 2.0 mN/m.

The terms "semiconducting" and "semi-conducting" as used herein, means a material whose conductivity, due to charges of both signs, is normally in the range between that of metals and insulators and in which the electric charge carrier density can be changed by external means. For example, a semiconducting material can be doped to increase its conductivity, e.g., oxidation of polythiophene, either chemically or electrochemically, greatly increases the material's conductivity.

The term "electrolyte" as used herein means a substance that when dissolved in a suitable solvent becomes an ionic conductor, for example, but not limited to, salts such as sodium chloride, potassium chloride, lithium chloride, lithium perchlorate, tetraethylammonium perchlorate, tetrabutylammonium tetrafluoroborate, tetrabutylammonium hexafluorophosphate, and the like. Typical electrolytes have cations selected from, but not limited to, lithium, sodium, potassium, and tetraalkylammonium; and anions selected from, but not limited to, fluoride, chloride, bromide, iodide, triiodide, perchlorate, tetrafluoroborate, and hexafluorophosphate.

The term "dichroic dye" as used herein means a material having the property of exhibiting different colors by reflected or transmitted light.

The term "hydrocarbon compound" as used herein means a chemical compound comprising only carbon and hydrogen atoms. Examples of hydrocarbons include, but are not limited to, methane, ethane, ethylene, 1,3-butadiene, acetylene, benzene, toluene, xylene, [2,2]cyclophane, [2,2]cyclophane-1,9-diene, naphthalene, anthracene, propane, butane, iso-butane, pentane, hexane, octane, decane, cyclopropane, methylcyclopropane, cyclobutane, cyclopentane, cyclohexane, cyclohexene, cyclooctadiene, cyclooctatetrene, dicyclopentadiene, cyclopentadiene, styrene, stilbene, biphenyl, limonene, and the like.

The term "Teflon™" is a DuPont trademark for the polymer poly(tetrafluoroethylene).

The term "Q factor" as used herein means the quality factor defined as $Q=1/D=1/\tan\delta$, wherein $\delta$ is the phase difference between voltage and current in a capacitance and D is the dissipation factor. The dissipation factor D is the fraction of the dissipated energy in the capacitor compared to the stored energy. Hence, the Q factor is defined as the ratio between the energy stored in the capacitance and the dissipated energy. A perfect capacitance would therefore have an infinite quality factor.

EXAMPLES

Table 1 below summarizes examples further described to illustrate the results obtained with the device according to the invention.

TABLE 1

| EXAMPLES | 1st layer | | | | | 2nd layer | | overall | |
|---|---|---|---|---|---|---|---|---|---|
| | Substrate nature | Material nature | thickness (nm) | dielectric constant | surface capacitance (pF/mm2) | Material** nature | thickness** (nm) | capacitance (pF/mm2) | Rc |
| Examples 1 to 5* | Si wafer | SiO$x$ | 500 | 3.9 | 69.06 | SiO$x$C$y$H$z$ | 90 | 55.97 | 5.27 |
| Example 6 | Si wafer | Si3N4 | 500 | 7 | 123.96 | SiO$x$C$y$H$z$ | 90 | 87.29 | 3.38 |
| Example 7 | Si wafer | SiO$x$ | 1000 | 3.9 | 34.53 | SiO$x$C$y$H$z$ | 90 | 30.91 | 9.55 |
| Example 8 | Metal bodycone | parylène C | 250 | 3.1 | 109.79 | SiO$x$C$y$H$z$ | 90 | 80.02 | 3.69 |
| Example 9 | Metal bodycone | parylène C | 5700 | 3.1 | 4.82 | SiO$x$C$y$H$z$ | 90 | 4.74 | 62.29 |

*Experimental conditions for obtaining the coating layers differ for each example 1 to 5.
**For examples 1 to 9, the same material SiO$x$C$y$H$z$ is used for the hydrophobic layer, with the dielectric constant equal to 3.0 and the surface capacitance equal to 295 pF/mm2.

In the following examples, the term "PECVD" refers to plasma enhanced chemical vapor deposition.

For some of the examples, experimental results are shown (FIGS. 6 to 11).

The figures show the Q factor and Capacitance measurements as a function of the applied voltage on the one hand, and the Optical Power and wavefront measurements of a liquid lens including a device according to the invention on the other hand.

The Q factor is representative of the material imperfection, some charges being able to go through the insulating material when a voltage is applied. The Q factor needs to be as large as possible and preferably to remain constant over time and applied voltage. If the Q factor decreases, as a function of voltage or time, an increasing current passes through the capacitance; and the material is likely to undergo some degradation, leading to a possible dielectric breakdown. Therefore, the Q factor is a measure of the quality of the capacitance. For example, the Q factor of a parylene C film of 6 microns is between about 20 and 30 at 1 kHz, such Parylene C forming a "good" capacitance with a Dissipation factor D=1/Q of about 0.03 to 0.05.

The measurements shown on the figures described below have been performed using a 4284 LCR meter from Agilent Technology. The capacitance (in Farads) and the Q factor are measured between 1 Vrms and the maximum driving voltage Vmax rms (V max=20 Vrms in the examples described below), ramping up and down the voltage to apply a voltage cycle. We also performed similar measurement at 2 times the driving voltage, V=40 V rms, to ensure that the capacitance will not undergo a dielectric breakdown at the maximum voltage (20 Vrms). Capacitance is considered as stable and reliable if both capacitance and Q factors are stable within +/−20% and if both capacitance and Q factor have reversible values when increasing and decreasing the voltage.

For optical characterization, a liquid lens of the type of the one described in FIG. 3 is used, including the device according to the invention and with the corresponding example. Measurements of the focal length are made as a function of the voltage V rms in Volt, as well as measurements of the wave front error RMS (in microns) as a function of the voltage V rms in Volt. The measurements were made with a wave front analyzer (Hazo™, Imagine Optic). Two kinds of measurements were performed. On-axis wave front measurement versus a set of discrete voltages applied (Vi) and on-axis wave front measurements versus the time when a step voltage function is applied to the lens.

Example 1

A two layer hydrophobic coating architecture composed of a silicon oxide layer and a subsequent hydrophobic layer was deposited onto nickel plated brass bodycone.

A 500 nm silicon oxide layer was deposited by PECVD of a SiH4 and N2O mixture. The substrate temperature was held at 200° C. during deposition. The dielectric constant and dielectric strength of the silicon oxide coating was 3.9 and 10 MV/cm, respectively. PECVD was conducted in a class 1 cleanroom to minimize defects in the coating.

A 90 nm organosiloxane coating was deposited by PECVD from tetramethyldisiloxane (TMDSO) at W/FM of 33 MJ/kg based on the process parameters including 500 W of applied power and 150 sccm TMDSO flowrate. The surface of the organosiloxane coating was characterized as hydrophobic based a reference liquid contact angle (RLCA) of 16.4±1.3 degrees, polar surface energy component of 1.4 mN/m and a dispersive surface energy component of 21.5 mN/m.

Figure 6:
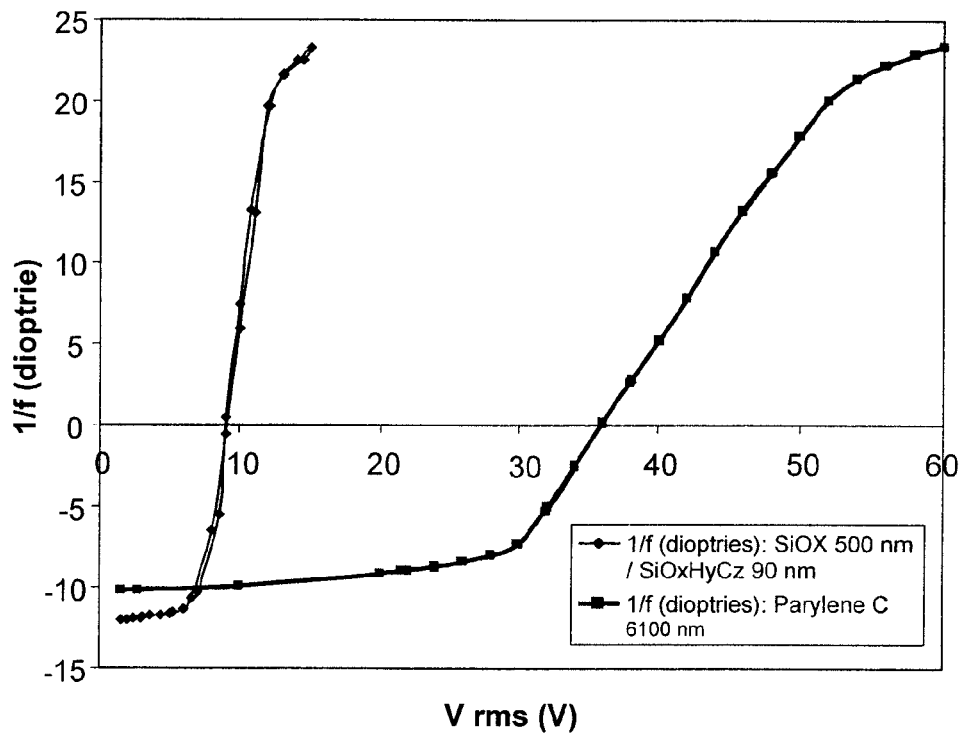
FIG. 6 illustrates the measurements of the Optical power as a function of voltage for a liquid lens according to the invention ("example 1") and a liquid lens according to prior art.
Figure 8A:
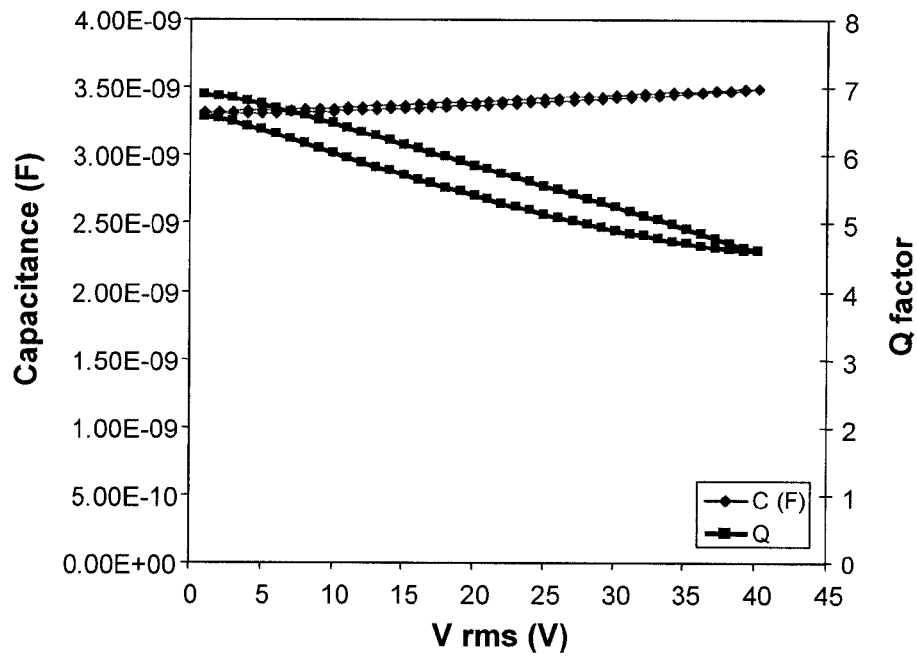
FIG. 8A illustrates the Capacitance and Q Factor as a function of the applied voltage with a two layers coating on Silicone according to another example ("example 1").
Figure 8B:
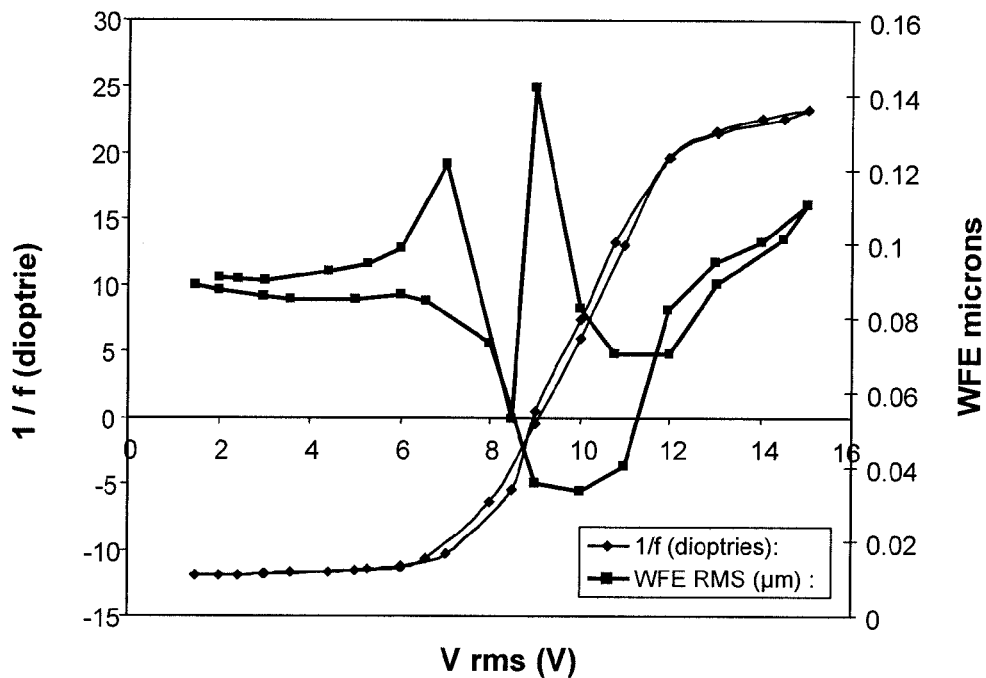
FIG. 8B illustrates the measurements of the Optical Power and Wavefront error of a liquid lens of the type of the one according to FIG. 3 using the coating of the example 1, as a function of the applied voltage.

FIGS. 6, 8A and 8B show the experimental results obtained with the coating according to example 1.

Capacitance and Q factor (FIG. 8A) show a very good stability as function of voltage.

The liquid lens obtained using such coating is a low voltage liquid lens (driving voltage inferior to 15 Volts), as shown on FIG. 8B and on FIG. 6, where the experimental curve is compared with the curve obtained using a liquid lens with a coating according to prior art (one layer Parylene C with a thickness of 6100 nm). Further, FIG. 8B shows a low value of the wave front error measured as a function of the applied voltage.

Example 2

A two layer hydrophobic coating architecture composed of a silicon oxide layer and a subsequent hydrophobic layer was deposited onto a P-type, boron doped, low resistivity (i.e. 0.01-0.02 ohm·cm) silicon wafer.

A 500 nm silicon oxide layer was deposited by PECVD of a SiH$_4$ and N$_2$O mixture. The substrate temperature was held at 400° C. during deposition. The dielectric constant and dielectric strength of the silicon oxide coating was 3.9 and 10 MV/cm, respectively. PECVD was conducted in a class 1 cleanroom to minimize defects in the coating.

A 90 nm organosiloxane coating was deposited by PECVD from tetramethyldisiloxane (TMDSO) at W/FM of 33 MJ/kg based on the process parameters listed in Table 2. The surface of the organosiloxane coating was characterized as hydrophobic based a reference liquid contact angle (RLCA) of 16.4±1.3 degrees, polar surface energy component of 1.4 mN/m and a dispersive surface energy component of 21.5 mN/m.

Coatings exhibited high dielectric stability and no breakdown at $2 \times V_{max}=40$ V and exhibited good reversibility after varying the working voltage between 0-20 V at 1 kHz every second for 100,000 cycles. Only 3° contact angle hysteresis was experienced within the effective range (contact angle>36°).

Example 3

A two layer hydrophobic coating architecture was deposited onto silicon wafers by the same process as in Example 2 using the same reagents. Coated wafers were annealed in a $N_2$ purged vacuum oven for 1 hour at 400° C. The surface of the organosiloxane coating was characterized as hydrophobic based on reference liquid contact angle (RLCA) of 12.3±1.1 degrees.

Example 4

A two layer hydrophobic coating architecture composed of a silicon oxide layer and a subsequent hydrophobic layer was deposited onto a P-type, boron doped, low resistivity (i.e. 0.01-0.02 ohm·cm) silicon wafer.

A 500 nm silicon oxide layer was deposited by PECVD of a $SiH_4$ and $N_2O$ mixture. The substrate temperature was held at 400° C. during deposition. The dielectric constant and dielectric strength of the silicon oxide coating was 3.9 and 10 MV/cm, respectively. PECVD was conducted in a class 1 cleanroom to minimize defects in the coating.

A 90 nm organosiloxane coating was deposited by PECVD from hexamethyldisiloxane (HMDSO) at W/FM of 28 MJ/kg based on the process parameters listed in Table 2. The surface of the organosiloxane coating was characterized as hydrophobic based on a low RLCA of 15.5±1.8 degrees, polar surface energy component of 0.6 mN/m and a dispersive surface energy component of 23.3 mN/m.

Coatings exhibited high dielectric stability and no breakdown at $2 \times V_{max}=40$ V, and exhibited good reversibility after varying the working voltage between 0-20V at 1 kHz every second for 100,000 cycles. Only 3° contact angle hysteresis was experienced within the effective range (contact angle>36°).

Example 5

A two layer hydrophobic coating architecture was deposited onto silicon wafers by the same process as in Example 4 using the same reagents. Coated wafers were annealed in a $N_2$ purged vacuum oven for 1 hour at 400° C. The surface of the organosiloxane coating was characterized as hydrophobic based on a low reference liquid contact angle (RLCA) of 9.0±0.7 degrees.

TABLE 2

PECVD process parameters and contact angles of hydrophobic coatings.

| | Process Parameters | | | | | | |
|---|---|---|---|---|---|---|---|
| Precursor | Flowrate (sccm) | Power (W) | Power Density W/FM (MJ/kg) | Post Thermal Annealing* | RLCA** (degrees) | Polar Surface Energy (mN/m) | Dispersive Surface Energy (mN/m) |
| TMDSO | 30 | 1500 | 499 | No | 77 | 1.2 | 29.9 |
| TMDSO | 30 | 1000 | 333 | No | 46.4 ± 3.7 | 1.1 | 28.6 |
| TMDSO | 30 | 500 | 166 | No | 35.6 ± 2.8 | 0.8 | 26.3 |
| TMDSO | 150 | 500 | 33 | No | 16.4 ± 1.3 | 1.4 | 21.5 |
| TMDSO | 150 | 500 | 33 | Yes | 12.3 ± 1.1 | | |
| HMDSO | 30 | 1500 | 413 | No | 44.7 | 0.7 | 286 |
| HMDSO | 30 | 1000 | 275 | No | 36.1 | 0.8 | 27.8 |
| HMDSO | 30 | 500 | 138 | No | 24.0 ± 0.8 | 0.5 | 26.3 |
| HMDSO | 150 | 500 | 28 | No | 15.5 ± 1.8 | 0.6 | 23.3 |
| HMDSO | 150 | 500 | 28 | Yes | 9 ± 0.7 | | |

*annealed 1 hr @ 400° C. in vacuum oven
**reference liquid contact angle (RLCA) 1 µL oil droplet in aqueous phase

Example 6

A two layer hydrophobic coating architecture composed of a silicon nitride layer and a subsequent hydrophobic layer was deposited onto a P-type, boron doped, low resistivity (i.e. 0.01-0.02 ohm·cm) silicon wafer.

A 500 nm silicon nitride layer was deposited by PECVD of a SiH4, N2 and NH3 mixture. The substrate temperature was held at 400° C. during deposition. The dielectric constant and dielectric strength of the silicon nitride coating was 7.5 and 10 MV/cm, respectively. PECVD was conducted in a class 1 cleanroom to minimize defects in the coating.

A 90 nm organosiloxane coating was deposited by PECVD from tetramethyldisiloxane (TMDSO) at W/FM of 33 MJ/kg based on the process parameters including 500 W of applied power and 150 sccm TMDSO flowrate. The surface of the organosiloxane coating was characterized as hydrophobic based on a reference liquid contact angle (RLCA) of 16.4±1.3 degrees, polar surface energy component of 1.4 mN/m and a dispersive surface energy component of 21.5 mN/m.

Figure 7:
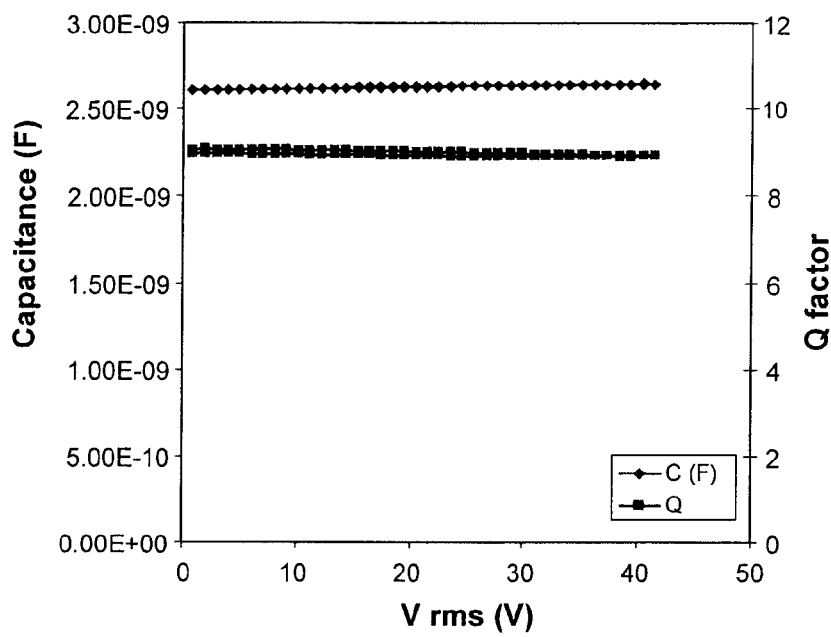
FIG. 7 illustrates the Capacitance and Q Factor as a function of the applied voltage for a two layers coating on Silicone according to an example ("example 6").

FIG. 7 shows the experimental results obtained with the coating according to example 6. Capacitance and Q factor show a very good stability as function of voltage.

Example 7

A two layer hydrophobic coating architecture composed of a silicon oxide layer and a subsequent hydrophobic layer was deposited onto a P-type, boron doped, low resistivity (i.e. 0.01-0.02 ohm·cm) silicon wafer.

A 500 nm silicon oxide layer was deposited by PECVD of a SiH4 and N2O mixture. The substrate temperature was held at 200° C. during deposition. The dielectric constant and dielectric strength of the silicon oxide coating was 3.9 and 10 MV/cm, respectively. PECVD was conducted in a class 1 cleanroom to minimize defects in the coating.

A 90 nm organosiloxane coating was deposited by PECVD from tetramethyldisiloxane (TMDSO) at W/FM of 33 MJ/kg based on the process parameters including 500 W of applied power and 150 sccm TMDSO flowrate. The surface of the organosiloxane coating was characterized as hydrophobic based a reference liquid contact angle (RLCA) of 16.4±1.3 degrees, polar surface energy component of 1.4 mN/m and a dispersive surface energy component of 21.5 mN/m.

Figure 9A:
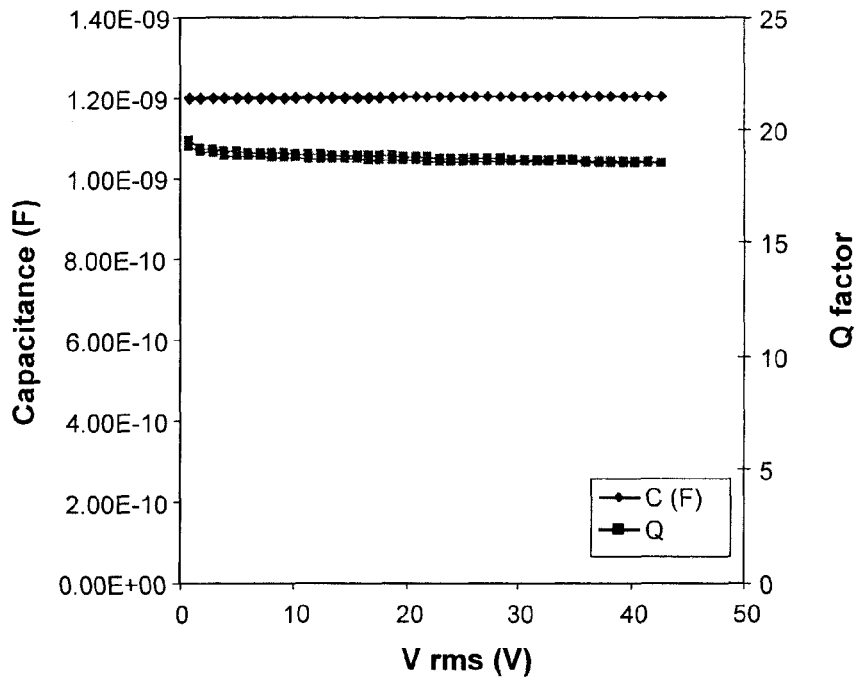
FIG. 9A illustrates the Capacitance and Q Factor as a function of the applied voltage with a two layers coating on Silicone according to another example ("example 7").
Figure 9B:
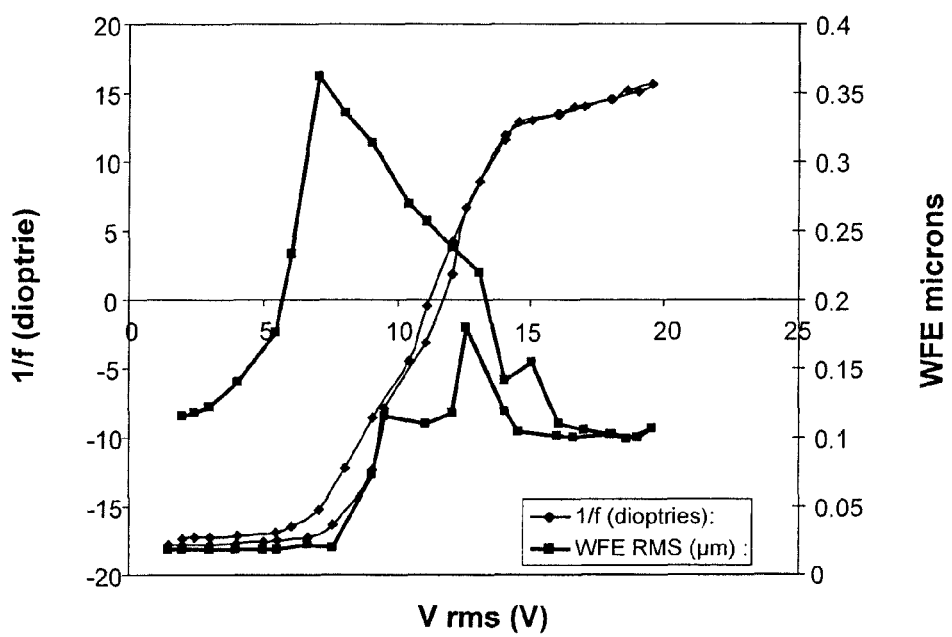
FIG. 9B illustrates the measurements of the Optical Power and Wavefront error of a liquid lens of the type of the one according to FIG. 3 using the coating of the example 7, as a function of the applied voltage.

FIGS. 9A and 9B show the experimental results obtained with the coating according to example 7.

Capacitance and Q factor (FIG. 9A) show a very good stability as function of voltage.

The liquid lens obtained using such coating is a low voltage liquid lens (driving voltage inferior to 20 Volts), as shown on FIG. 9B. Further, FIG. 9B shows a low value of the wave front error measured as a function of the applied voltage.

Example 8

A 90 nm organosiloxane coating was deposited by PECVD from tetramethyldisiloxane (TMDSO) at W/FM of 33 MJ/kg based on the process parameters including 500 W of applied power and 150 sccm TMDSO flowrate. The surface of the organosiloxane coating was characterized as hydrophobic based a reference liquid contact angle (RLCA) of 16.4±1.3 degrees, polar surface energy component of 1.4 mN/m and a dispersive surface energy component of 21.5 mN/m.

Figure 10:
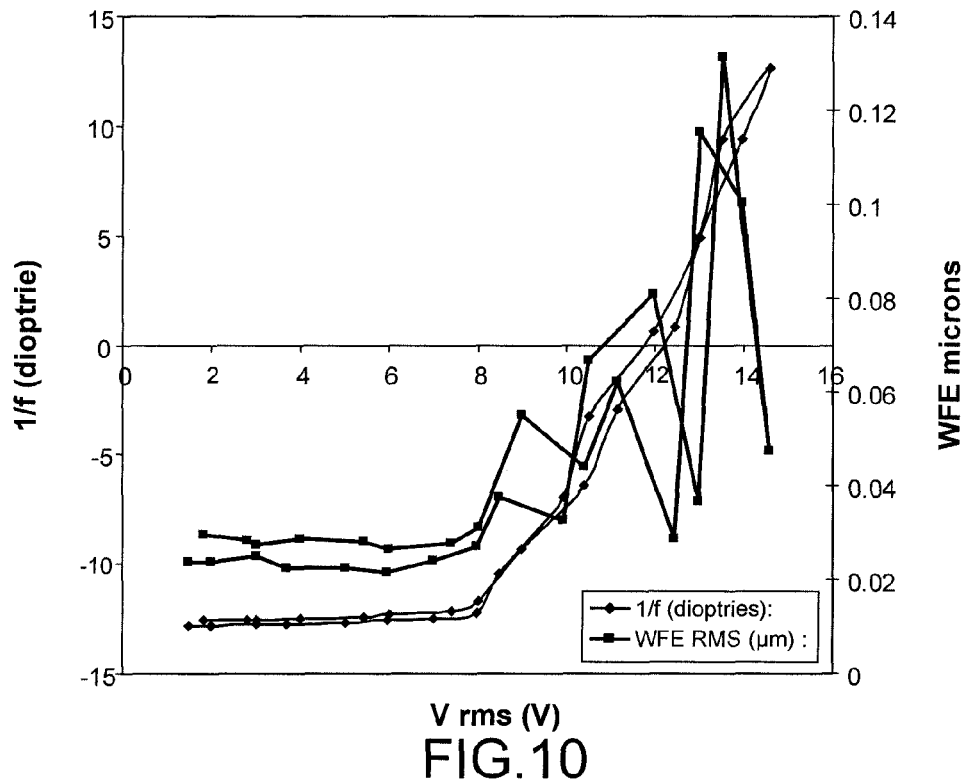
FIG. 10 illustrates the measurements of the Optical Power and Wavefront error of a liquid lens of the type of the one according to FIG. 3 using the coating of another example ("example 8"), as a function of the applied voltage.
Figure 11:
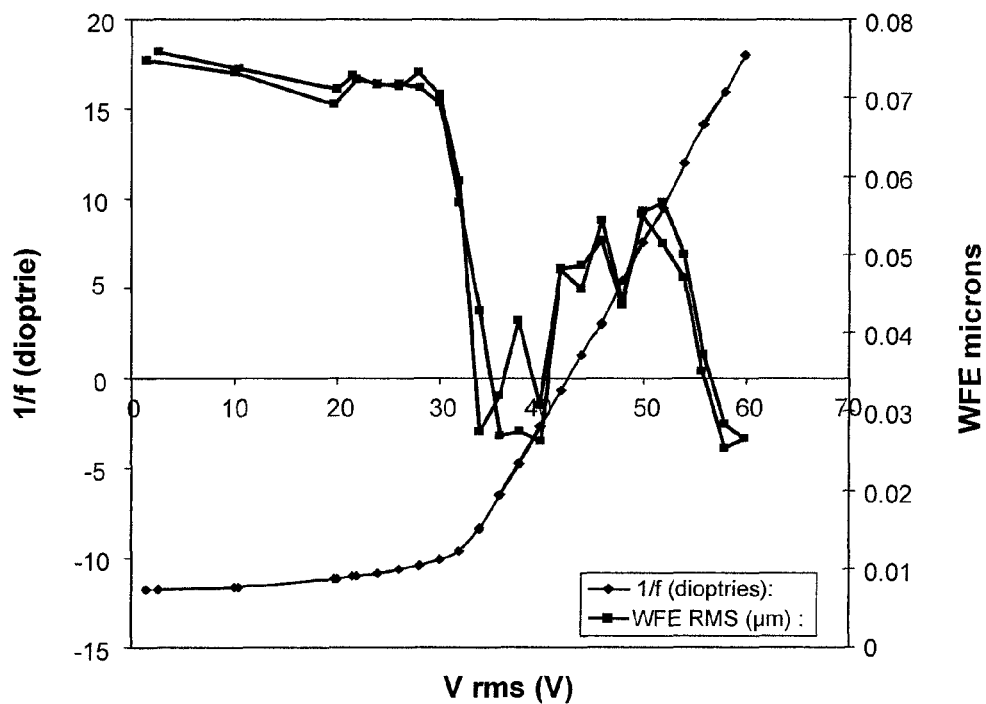
FIG. 11 illustrates the measurements of the Optical Power and Wavefront error of a liquid lens of the type of the one according to FIG. 3 using the coating of another example ("example 9"), as a function of the applied voltage.

FIG. 10 shows the experimental results obtained with the coating according to example 8. The liquid lens obtained using such coating is a low voltage liquid lens (driving voltage inferior to 15 Volts). Further, FIG. 10 shows a low value of the wave front error measured as a function of the applied voltage.

Example 9

A two layer dielectric hydrophobic coating architecture composed of dielectric layer made of Parylene C (poly-chloro-para-xylylene) and a subsequent hydrophobic layer was deposited onto a conical surface of a metal body of a liquid lens device as described with reference to FIG. 3.

A 5700 nm Parylene C layer was first deposited by CVD (Chemical Vapor Deposition) process, or more precisely VDP (Vapor Deposition Polymerization process) process, following the classical Gorham's method[1]. The process takes place in two stages that must be physically separate but temporally adjacent. In this process the di-monochloro-(para-xylylene) dimer is quantitatively cleaved to two molecules of the reactive intermediate monochloro-para-xylylene monomer. This occurs in the vapor phase under vacuum at temperatures of approximatively 600° C. to 700° C. In systems maintained below 133.3 Pa (1 torr), reactive monochloro-para-xylylene monomer, polymerizes on surfaces kept below 30° C. to form (poly-chloro-para-xylylene) polymer. The dielectric constant and dielectric strength of parylene C film is 3.1 at 1 kHz and 2.2 MV/cm (for a 25 microns films) respectively. The CVD process (or VDP process) was conducted in a class 100 clean room to minimize defects due to particles, in the coating.

[1]W. F. Gorham, J. Polym. Sci. A-1, 4, 3027 (1966).

After the Parylene C coating, a 90 nm organosiloxane coating was deposited by PECVD from hexamethyldisiloxane (HMDSO) at W/FM of 28 MJ/kg based on the process parameters listed in Table 2. The surface of the organosiloxane coating was characterized as hydrophobic based on a low RLCA of 15.5±1.8 degrees, polar surface energy component of 0.6 mN/m and a dispersive surface energy component of 23.3 mN/m.

The above described coating exhibits high dielectric stability and no breakdown at $2\times V_{max}=120$ V. Liquid lenses made with such coating shows a very good reliability, i.e. good stability of the physical properties (low hysteresis, low wave front error, stability of the driving voltage) after on-off test (60 V at 4 Hz during more than $10^6$ cycles), and thermal test (85° C./10 humidity during 120 h).

The different examples described above show that the two layers coating according to the invention, with the specific ratio between the surface capacitances, enables a good reliability of both dielectric and wetting properties. In particular, it enables to design coatings for low voltage electrowetting devices.

Advantageously, the hydrophobic layer will be as thin as possible to have a Rc ratio high enough, but sufficiently thick to keep the wetting properties of the layer. The applicant has shown that the hydrophobic layer should be chosen preferably between about 10 to about 250 nm, more preferably between 50 nm to 150 nm.

Although the examples above were described using SiOxCyHz as the hydrophobic layer material, it will be well understood from the man skilled in the art that other materials could be used for the hydrophobic layer, preferably those materials that enable a layer to be formed by plasma enhanced chemical vapor deposition.

It is understood that the foregoing detailed description and accompanying Examples are merely illustrative and are not to be taken as limitations upon the scope of the invention, which is defined by the appended claims. Various changes and modifications to the disclosed embodiments will be apparent to those skilled in the art. Such changes and modifications, including without limitation those relating to the chemical structures, substituents, derivatives, intermediates, syntheses, and/or methods of use of the invention, may be made without departing from the spirit and scope thereof.

We claim:
1. A device comprising:
a liquid;
a first member in contact with the liquid; wherein
the first member comprises a coating, wherein
the coating comprises at least two layers, a first layer which is a hydrophobic layer having a dielectric constant of greater than about 2.5 and a second layer which is an insulating layer having a dielectric constant of greater than about 2.5, wherein
the ratio of the surface capacitance of the hydrophobic layer and the surface capacitance of the overall coating is greater than about 2.0;
and
a second member in contact with the liquid.

2. The device of claim 1, wherein
the first member comprises one or more conducting or semiconducting materials in contact with the coating, and
the second member comprises one or more conducting or semiconducting materials in contact with the liquid.

3. The device of claim 1, wherein the second layer comprises SiO2, silicon oxynitride, Si$_3$N$_4$, hafnium oxide, yttrium oxide, lanthanum oxide, titanium dioxide, aluminum oxide, tantalum oxide, hafnium silicate, zirconium oxide, zirconium silicate, barium titanate, lead zirconate titanate, strontium titanate, barium strontium titanate, or mixtures thereof.

4. The device of claim 1, wherein the second layer comprises Parylene C or Parylene N.

5. The device of claim 1, wherein at least the hydrophobic layer is formed by plasma enhanced chemical vapor deposition from a vapor comprising an organosilane, organosiloxane, organosilazane, organometallic, or hydrocarbon compound.

6. The device of claim 5, wherein each layer of the coating is formed by plasma enhanced chemical vapor deposition from a vapor comprising of an organosilane, organosiloxane, organosilazane, organometallic, or hydrocarbon compound.

7. The device of claim 5, wherein the composite plasma parameter (W/FM) is less than about 200 MJ/kg.

8. The device of claim 1, wherein at least one layer is formed by plasma enhanced chemical vapor deposition from a vapor comprising of an oxidizing gas and an organosilane, organosiloxane, or organosilazane compound.

9. The device of claim 5, wherein the organosilane, organosiloxane, or organosilazane is of one of the formulas, $(R_3)Si$—$[(R_2)Si]_n$—$R$,    $(R_3)Si$—$[X]$—$Si(R)_3$, or

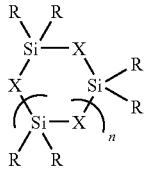

wherein
each X is independently —O—, —N(R$^1$)—, or —(R$^2$)$_2$C—;
each R is independently H, C$_1$-C$_6$ alkyl, C$_1$-C$_6$ alkoxy, C$_2$-C$_6$ alkenyl, or phenyl;
each R$^1$ and R$^2$ is independently H or C$_1$-C$_6$ alkyl;
and each n is independently 0, 1, 2, or 3.

10. The device of claim 9, wherein the organosilane compound is silane, dimethylsilane, trimethylsilane, tetramethylsilane, propylsilane, phenylsilane, hexamethyldisilane, 1,1,2,2-tetramethyldisilane, bis(trimethylsilyl)methane, bis(dimethylsilyl)methane, vinyltrimethylsilane, or mixtures thereof.

11. The device of claim 9, wherein the organosiloxane compound is tetramethylsiloxane, hexamethylsiloxane, divinyltetramethyldisiloxane, divinylhexamethyltrisiloxane, trivinylpentamethyltrisiloxane, tetraethylorthosilicate, vinyl trimethoxysilane, vinyltriethoxysilane, ethylmethoxysilane, ethyltrimethoxysilane, methyltrimethoxysilane, vinyltrimethyoxysilane, octamethylcyclotetrasiloxane, tetramethylcyclotetrasiloxane, tetraethylorthosiloxane, or mixtures thereof.

12. The device of claim 9, wherein the organosilazane compound is hexamethyldisilazane, tetramethyldisilazane, or mixtures thereof.

13. The device of claim 5, wherein the organometallic compound is tetramethyltin, diethylzinc, titanium tetrachloride, butyltrivinyltin, or mixtures thereof.

14. The device of claim 5, wherein the hydrocarbon compound is methane, acetylene, ethane, ethylene, styrene, or mixtures thereof.

15. The device of claim 1, wherein the liquid comprises water.

16. The device of claim 1, wherein the coating has a thickness of about 10 nm to about 1000 nm.

17. The device of claim 1, wherein the hydrophobic layer has a thickness of about 10 nm to about 250 nm, more preferably 50 nm to 150 nm.

18. The device of claim 1, wherein
the first member further comprises a first support; and
the second member further comprises a second support, wherein
the first and second supports are independently glass, plastic, or silicon.

19. The device of claim 1, wherein the first and second members comprise a circuit.

20. The device of claim 1, wherein the hydrophobic layer has a polar surface energy component of less than about 2.0 mN/m.

21. The device of claim 20, wherein the polar surface energy component is about 0.0 mN/m.

22. The device of claim 1, wherein the hydrophobic layer is formed by plasma enhanced chemical vapor deposition from a vapor comprising an organosiloxane or organosilane, and has a dispersive surface energy component of less than about 40 mN/m.

23. The device of claim 22, wherein the dispersive surface energy component of less than about 20 mN/m.

24. The device of claim 1, wherein the layers are annealed.

25. A method for altering the contact angle of a liquid comprising:
applying a voltage across first and second members, wherein
the first member comprises a coating in contact with the liquid and one or more conducting or semiconducting materials in contact with the coating and the second member comprises one or more conducting or semiconducting materials in contact with the liquid, wherein
the coating comprises at least two layers, a first layer which is a hydrophobic layer having a dielectric constant of greater than about 2.5 and a second layer which is an insulating layer having a dielectric constant of greater than about 2.5, wherein
the ratio of the surface capacitance of the hydrophobic layer and the surface capacitance of the overall coating is greater than about 2.0.

26. The method of claim 25, wherein the second layer comprises SiO2, silicon oxynitride, Si$_3$N$_4$, hafnium oxide, yttrium oxide, lanthanum oxide, titanium dioxide, aluminum oxide, tantalum oxide, hafnium silicate, zirconium oxide, zirconium silicate, barium titanate, lead zirconate titanate, strontium titanate, barium strontium titanate, or mixtures thereof.

27. The method of claim 25, wherein the second layer comprises Parylene C or Parylene N.

28. The method of claim 25, wherein at least the hydrophobic layer is formed by plasma enhanced chemical vapor deposition from a vapor comprising an organosilane, organosiloxane, organosilazane, organometallic, or hydrocarbon compound.

29. The method of claim 28, wherein each layer of the coating is formed by plasma enhanced chemical vapor deposition from a vapor comprising of an organosilane, organosiloxane, organosilazane, organometallic, or hydrocarbon compound.

30. The method of claim 28 wherein the composite plasma parameter (W/FM) is less than about 200 MJ/kg.

31. The method claim 25, wherein the second layer is formed by plasma enhanced chemical vapor deposition from a vapor comprising of an oxidizing gas and an organosilane, organosiloxane, or organosilazane compound.

32. The method of claim 28, wherein the organosilane, organosiloxane, or organosilazane is of one of the formulas,

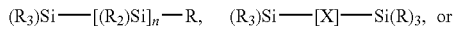

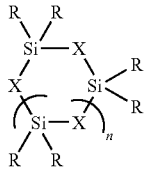

wherein
each X is independently —O—, —N($R^1$)—, or —($R^2$)$_2$C—;
each R is independently H, $C_1$-$C_6$ alkyl, $C_1$-$C_6$ alkoxy, $C_2$-$C_6$ alkenyl, or phenyl;
each $R^1$ and $R^2$ is independently H or $C_1$-$C_6$ alkyl;
and each n is independently 0, 1, 2, or 3.

33. The method of claim 32, wherein the organosilane compound is silane, dimethylsilane, trimethylsilane, tetramethylsilane, propylsilane, phenylsilane, hexamethyldisilane, 1,1,2,2-tetramethyldisilane, bis(trimethylsilyl)methane, bis(dimethylsilyl)methane, vinyltrimethylsilane, or mixtures thereof.

34. The method of claim 32, wherein the organosiloxane compound is tetramethylsiloxane, hexamethylsiloxane, divinyltetramethyldisiloxane, divinylhexamethyltrisiloxane, trivinylpentamethyltrisiloxane, tetraethylorthosilicate, vinyl trimethoxysilane, vinyltriethoxysilane, ethylmethoxysilane, ethyltrimethoxysilane, methyltrimethoxysilane, vinyltrimethyoxysilane, octamethylcyclotetrasiloxane, tetramethylcyclotetrasiloxane, tetraethylorthosiloxane, or mixtures thereof.

35. The method of claim 32, wherein the organosilazane compound is hexamethyldisilazane, tetramethyldisilazane, or mixtures thereof.

36. The method of claim 28, wherein the organometallic compound is tetramethyltin, diethylzinc, titanium tetrachloride, butyltrivinyltin, or mixtures thereof.

37. The method of claim 28, wherein the hydrocarbon compound is methane, acetylene, ethane, ethylene, styrene, or mixtures thereof.

38. The method of claim 25, wherein the hydrophobic layer is formed by plasma enhanced chemical vapor deposition from a vapor comprising an organosiloxane or organosilane, and has a dispersive surface energy component of less than about 40 mN/m.

39. The method of claim 38, wherein the dispersive surface energy component of less than about 20 mN/m.

40. The method of claim 26, wherein the applied voltage is less than about 40 V.

41. A method for changing the focal length of a lens, wherein the lens comprises a liquid, comprising:
altering the contact angle of the liquid in contact with first and second members by applying a voltage across the first and second members, wherein
the first member comprises a coating in contact with the liquid and one or more conducting or semiconducting materials in contact with the coating and the second member comprises one or more conducting or semiconducting materials in contact with the liquid, wherein
the coating comprises at least two layers, a first layer which is a hydrophobic layer having a dielectric constant of greater than about 2.5 and a second layer which is an insulating layer having a dielectric constant of greater than about 2.5, wherein
the ratio of the surface capacitance of the hydrophobic layer and the surface capacitance of the overall coating is greater than about 2.0.

42. A method for moving a liquid, comprising:
altering the contact angle of a liquid in contact with first and second members by applying a voltage across the first and second members, wherein
the first member comprises a coating in contact with the liquid and one or more conducting or semiconducting materials in contact with the coating and the second member comprises one or more conducting or semiconducting materials in contact with the liquid, wherein
the coating comprises at least two layers, a first layer which is a hydrophobic layer having a dielectric constant of greater than about 2.5 and a second layer which is an insulating layer having a dielectric constant of greater than about 2.5, wherein
the ratio of the surface capacitance of the hydrophobic layer and the surface capacitance of the overall coating is greater than about 2.0.

43. A variable focal length lens assembly comprising a device according to claim 1.

44. A microfluidic assembly comprising a device according to claim 1.

45. A light valve assembly comprising a device according to claim 1.

* * * * *